UNITED STATES PATENT OFFICE.

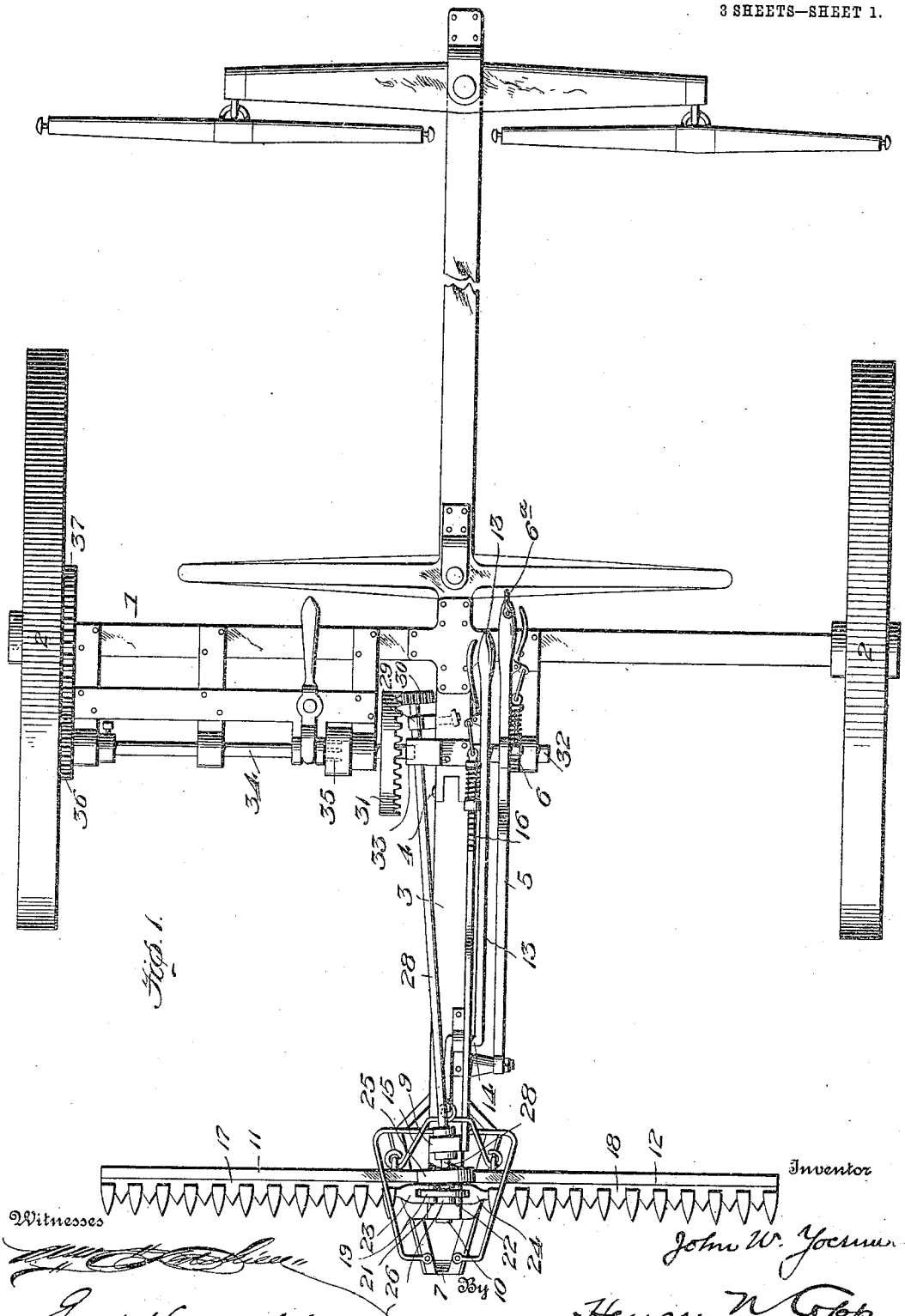

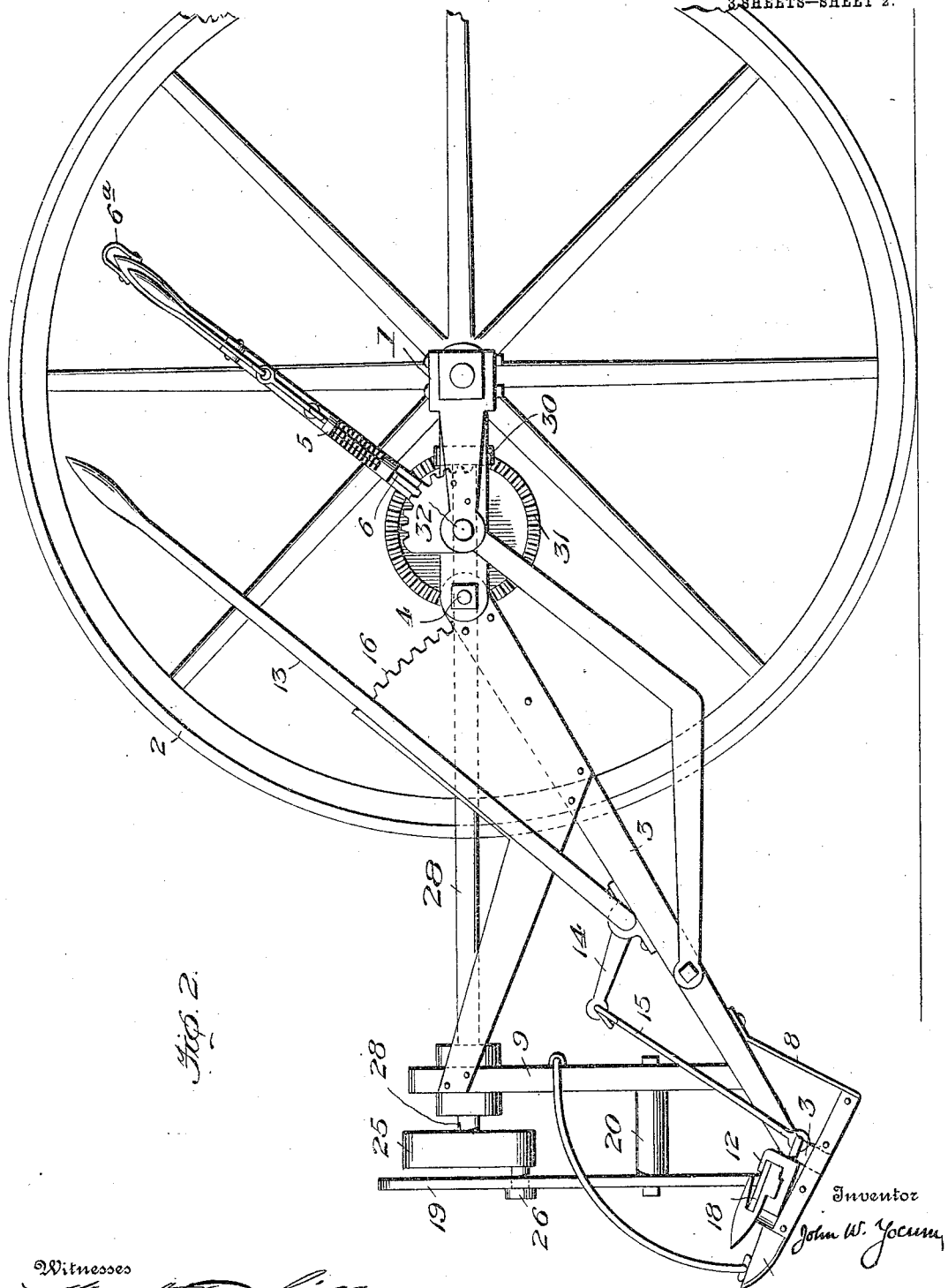

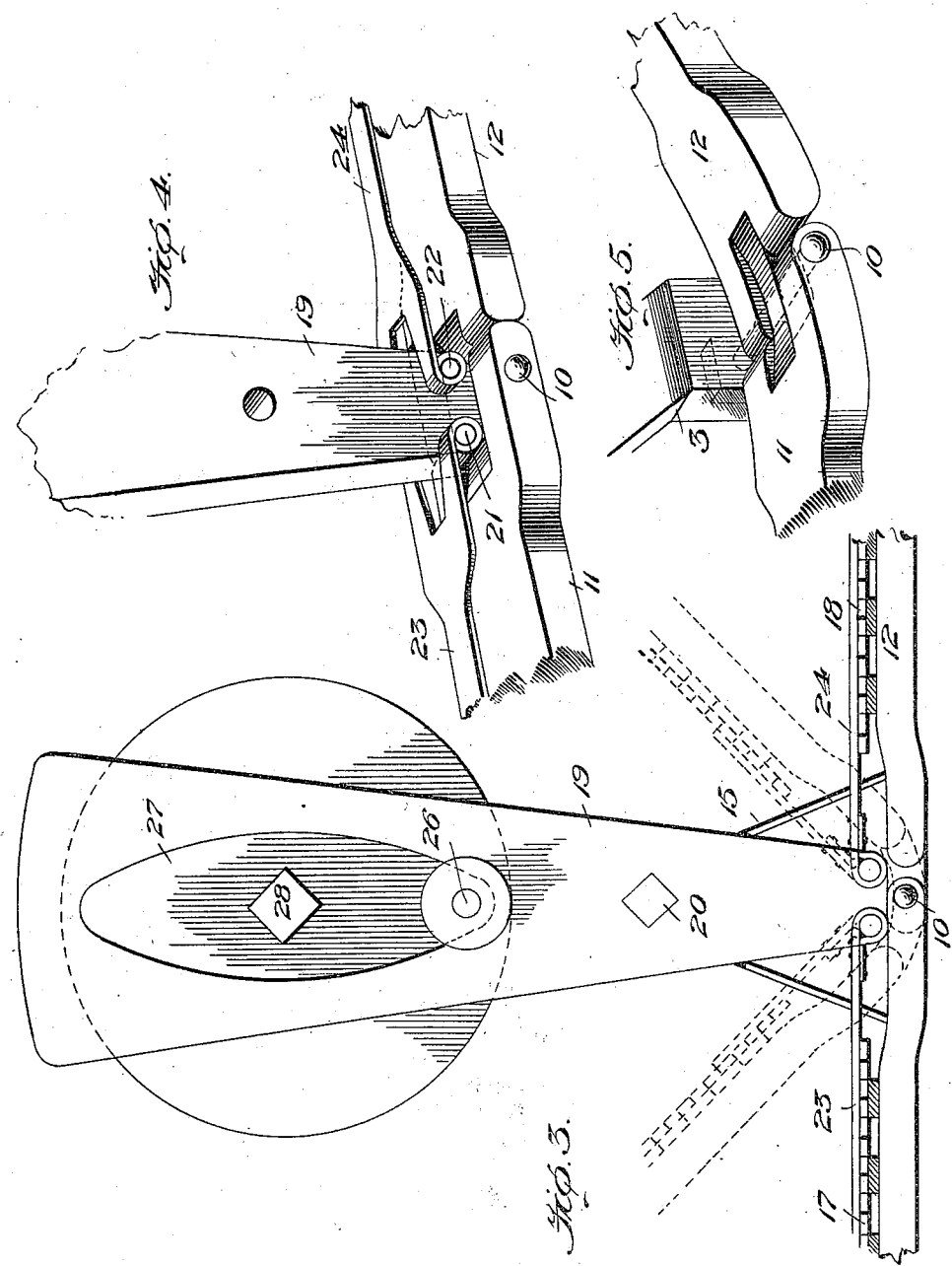

JOHN W. YOCUM, OF LOVELOCK, NEVADA.

DITCH-MOWER.

961,995.  Specification of Letters Patent.  Patented June 21, 1910.

Application filed November 20, 1908. Serial No. 463,599.

*To all whom it may concern:*

Be it known that I, JOHN W. YOCUM, a citizen of the United States, residing at Lovelock, county of Humboldt, and State of Nevada, have invented certain new and useful Improvements in Ditch-Mowers, of which the following is a specification.

My invention relates to ditch mowers.

Cutting of the grass growing on the sides of an irrigating ditch is, as at present practiced, a difficult and expensive operation and the present invention has for its object the provision of a novel machine whereby this operation may be expeditiously carried out.

The object of the present invention is accomplished by the provision of a machine embodying cutters arranged and constructed in novel fashion so that they may be adjusted to any desired angles according to the slope of the sides of the ditch and there maintained and adapted for operation as the machine advances to mow the grass on the sides of the ditch.

In addition to the foregoing novel construction, the invention embraces novel operating means for the cutters, novel means whereby the cutters may be raised or lowered as an entirety, and other instrumentalities all as fully set forth hereinafter and recited in the appended claims.

In the accompanying drawings:—Figure 1 is a plan view; Fig. 2, a side elevation showing the parts raised, one of the traction wheels being removed; Fig. 3, a detail elevation showing the cutter operating means and manner of hinging the cutters, dotted lines representing the cutters raised; Fig. 4, a perspective detail of the lower part of Fig. 3; and Fig. 5, a detail showing how the finger bars are pivoted.

The frame 1 is carried by suitable traction wheels 2 sufficiently spaced apart to straddle or bridge the ditch to be mowed, the mowing or cutting mechanism being carried by the frame-piece 3 which is hinged to the frame 1 at 4 so that it may be raised or lowered by lever mechanism 5 journaled on stub shaft 32 carried by frame 1 and which may be suitably latched at 6 to hold the frame-piece 3 at any desired angle but the latch is designed to normally be held disengaged by a catch 6ᵃ so that the frame-piece 3 is free to automatically rise and fall according to the inequalities of the ground traversed by the cutting mechanism.

At the lower end of the frame-piece 3 is a shoe 7 which is adapted to run along the bottom of the ditch while the machine is in operation, said shoe being connected by a brace 8 to frame-piece 3. An upright 9, rising from frame 3, supports certain of the operating devices.

At the lower end of the frame-piece 3 is a pivot bolt 10 on which finger bars 11 and 12 are pivoted so that they may be positioned at different angles to the horizontal. To manipulate these finger bars 11 and 12 there is provided a hand lever 13, crank 14 and flexible bail 15, the hand lever being locked in different positions by the pawl and rack mechanism 16. The finger bars are simultaneously raised or lowered so that both assume the same angle in relation to the horizontal when the lever 13 is manipulated but the bail 15 permits the finger bars to automatically rise and fall independently of the frame-piece 3 and position of lever 13 so that they may conform to any irregularities of the ground, or difference in angles of the sides of the ditch. The cutter bars 17 and 18 slide to and fro on the finger bars 11 and 12, respectively, in a well known manner but a special operating mechanism therefor is provided consisting of a rocker 19 pivoted on a stud 20 projecting from the upright 9, said rocker having at its lower end pairs of studs 21 and 22 to which straps 23 and 24, connected to the respective cutter bars 17 and 18, are pivoted. The lower end of the rocker 19 is adapted to play across the pivoted ends of the finger bars 11 and 12 without touching them, regardless of the angular inclination of said finger bars, the oscillation of said rocker being accomplished by a wrist wheel 25 whose pin 26 plays in the slot 27 in the rocker 19. The wrist wheel is carried by a shaft 28 journaled in the upright 9 and in a bearing 29 mounted on the main frame.

Shaft 28 carries a pinion 30 which is driven by a gear 31 driven by a shaft 34 one of whose ends is journaled in one side of a block 33 carried by the frame 1, the shaft 28 passing through said block and thus the vertical play of shaft 28 incident to the elevation or depression of the member 3 does not interfere with the meshing of the gears 30 and 31, the bearing 29 being pivoted to accommodate this movement. The gear 31 is driven from the shaft 34 by a releasable clutch 35 which may be thrown into or out of operation as desired. Shaft 34 carries a pinion 36 which meshes with the gear 37 on one of the traction wheels.

The machine having been positioned to straddle the ditch to be mowed, the shoe 7 is allowed to rest on the bottom of the ditch and the finger bars are then adjusted to the necessary angle to cause them to rest upon the sides of the ditch along which they travel as the machine advances, the operating mechanism meanwhile causing oscillation of the rocker 19 which reciprocates the cutter bars 17 and 18, effecting the mowing operation. Being pivoted at 10 the finger bars and cutters will rise and fall, that is, conform themselves to any inequalities in the ditch but if an obstacle is encountered the entire cutting mechanism may be raised quickly by manipulating lever 5 and the cutting mechanism may be thrown out of operation at any time by opening the clutch 35. The pivoting of frame-piece at 4 permits the entire cutting mechanism to automatically rise and fall.

Having thus described my invention what I claim as new and desire to secure by Letters Patent, is:—

1. In a ditch mower, the combination with a pivoted frame-piece and a shoe carried thereby which is adapted to travel along the ground, said frame-piece and shoe being free to automatically rise and fall, of a lever adapted for raising the frame-piece and having means for securing the frame-piece in raised position, finger bars pivoted to the shoe, a lever carried by the frame-piece, connections between said lever and the respective finger bars which permit them to independently rise and fall, independently of the rise and fall of the frame-piece, means for locking the lever last-named to initially set the finger bars, cutting mechanism carried by the finger bars, and means for operating said cutting mechanism.

2. In a ditch mower, the combination with a shoe, of finger bars pivoted to said shoe and adapted to automatically rise and fall independently of each other, means for sustaining said finger bars, cutters carried by the finger bars, a rocker connected to both the said cutters and so pivoted that it will operate them at all times, regardless of the position of the finger bars, and a wrist wheel for oscillating said rocker.

In testimony whereof, I hereunto affix my signature in presence of two witnesses.

JOHN W. YOCUM.

Witnesses:
H. C. HARDESTY,
J. V. RUCKMAN.